(12) United States Patent
Miyanaga (10) Patent No.: US 9,950,445 B2
(45) Date of Patent: Apr. 24, 2018

(54) HOLE-DRILLING DEVICE FOR DRILLING HOLE WITH EXPANDED DIAMETER HOLE PORTION

(71) Applicant: KABUSHIKI KAISHA MIYANAGA, Miki-shi, Hyogo (JP)

(72) Inventor: Masaaki Miyanaga, Miki (JP)

(73) Assignee: KABUSHIKI KAISHA MIYANAGA, Miki-shi, Hyogo (JP)

( * ) Notice: Subject to any disclaimer, the term of this patent is extended or adjusted under 35 U.S.C. 154(b) by 241 days.

(21) Appl. No.: 14/913,652

(22) PCT Filed: Aug. 6, 2014

(86) PCT No.: PCT/JP2014/004099
§ 371 (c)(1),
(2) Date: Feb. 22, 2016

(87) PCT Pub. No.: WO2015/025492
PCT Pub. Date: Feb. 26, 2015

(65) Prior Publication Data
US 2016/0207222 A1    Jul. 21, 2016

(30) Foreign Application Priority Data

Aug. 23, 2013  (JP) .................................. 2013-173708

(51) Int. Cl.
*B28D 1/14* (2006.01)
*B23B 51/00* (2006.01)
*B23B 51/08* (2006.01)

(52) U.S. Cl.
CPC .......... *B28D 1/146* (2013.01); *B23B 51/0045* (2013.01); *B23B 51/08* (2013.01);
(Continued)

(58) Field of Classification Search
CPC ..... B23B 51/0045; B23B 51/08; B28D 1/146; Y10T 408/858; Y10T 408/85884; Y10T 408/8595; Y10T 408/9065
See application file for complete search history.

(56) References Cited

U.S. PATENT DOCUMENTS

| 2,541,537 A | * | 2/1951 | Newcomb | ........... | B23B 51/0045 |
| | | | | | 408/158 |
| 4,307,636 A | * | 12/1981 | Lacey | ................. | B23B 51/0045 |
| | | | | | 408/159 |

(Continued)

FOREIGN PATENT DOCUMENTS

| DE | 3909481 A1 | 9/1990 |
| JP | S54159790 A | 12/1979 |

(Continued)

OTHER PUBLICATIONS

Extended European Search Report for European Patent Application No. 14838507.3, dated Feb. 24, 2017.

(Continued)

*Primary Examiner* — Eric A Gates
(74) *Attorney, Agent, or Firm* — Marshall, Gerstein & Borun LLP (57) ABSTRACT

A device for drilling a hole with an expanded diameter includes: a body, a shank; a sleeve; a compression spring; a drill bit body; an expanded diameter hole portion forming member attached to a side surface of the drill bit body and configured such that a cutting bit protrudes laterally from the drill bit body when the expanded diameter hole portion forming member moves forward on the side surface; a compression spring, which urges the expanded diameter hole portion forming member rearward relative to the drill bit body; and a cam. The expanded diameter hole portion forming member is configured to move forward on the side (Continued)

surface of the drill bit body owing to rotation of the cam when the body moves forward relative to the sleeve.

4 Claims, 6 Drawing Sheets

(52) U.S. Cl.
CPC ....... *B23B 2226/75* (2013.01); *B23B 2260/02* (2013.01); *Y10T 408/50* (2015.01); *Y10T 408/858* (2015.01); *Y10T 408/8595* (2015.01); *Y10T 408/85884* (2015.01); *Y10T 408/9065* (2015.01)

(56) References Cited

U.S. PATENT DOCUMENTS

| | | | | |
|---|---|---|---|---|
| 4,635,737 A | * | 1/1987 | Miyanaga | ........... B23B 51/0045 175/284 |
| 4,998,981 A | | 3/1991 | Miyanaga | |
| 5,735,650 A | * | 4/1998 | Miyanaga | ........... B23B 51/0045 175/286 |
| 5,810,523 A | * | 9/1998 | Miyanaga | ........... B23B 51/0045 408/153 |
| 6,851,492 B2 | * | 2/2005 | Sato | .................... B23B 51/0027 175/273 |
| 2002/0189866 A1 | | 12/2002 | Sato | |
| 2012/0070244 A1 | | 3/2012 | Stern | |

FOREIGN PATENT DOCUMENTS

| | | |
|---|---|---|
| JP | 07-276352 | 10/1995 |
| JP | 08-229931 | 9/1996 |
| JP | 09-239722 | 9/1997 |
| JP | 11-077662 | 3/1999 |

OTHER PUBLICATIONS

Search Report and Written Opinion for PCT/JP2014/004099, dated Oct. 7, 2014.
International Preliminary Report on Patentability for PCT/JP2014/004099, dated Feb. 23, 2016.

* cited by examiner

HOLE-DRILLING DEVICE FOR DRILLING HOLE WITH EXPANDED DIAMETER HOLE PORTION

FIELD

The present invention relates to a hole-drilling device for drilling a hole with an expanded diameter hole portion, the hole-drilling device drilling a hole with a predetermined depth in a drilling object, such as concrete, and at the same time, forming an expanded diameter hole portion in the inner part of the drilled hole by cutting.

BACKGROUND ART

In the case of implanting an anchor bolt in a drilling object, such as concrete, there is a method of using an anchor bolt whose base portion is fitted with a slitted cylindrical body provided with a slit formed in its axial direction. In this method, a hole with a predetermined depth is drilled in the drilling object, and the base portion of the anchor bolt is inserted in the drilled hole. Thereafter, the slitted cylindrical body is expanded inside the hole such that frictional resistance is exerted between the cylindrical body and the wall of the hole, and thereby the anchor bolt is implanted.

In this case, the pull-out strength of the anchor bolt implanted in the drilling object greatly depends on the strength of the joint between the wall of the drilled hole and the expanded slitted cylindrical body. Accordingly, an expanded diameter hole portion where the diameter of the drilled hole is expanded by cutting the wall of the hole may be formed in advance in the inner part of the drilled hole at a position corresponding to the base portion of the implanted anchor bolt. In this manner, the pull-out strength of the anchor bolt can be greatly increased.

Therefore, various conventional hole-drilling devices for drilling a hole with an expanded diameter hole portion have been proposed. Such a conventional hole-drilling device drills a straight hole with a predetermined depth in a drilling object, such as concrete, by using a hole-drilling tool such as a hammer drill, and also, forms an expanded diameter hole portion in the inner part of the drilled hole by cutting.

As a hole-drilling device of this type, the inventor of the present invention has previously proposed a hole-drilling device for drilling a hole with an expanded diameter hole portion, which is configured as follows: a drill bit body is fixed to the center of the lower end of a base including a shank; an expanded diameter hole portion forming member is movably attached to a guide groove formed in the side surface of the drill bit body; a cylindrical sleeve is provided on the lower part of the base such that the cylindrical sleeve is movable upward and downward; a lifting spring is provided between the cylindrical sleeve and the expanded diameter hole portion forming member; a pushing plate that moves upward and downward in conjunction with the expanded diameter hole portion forming member is disposed in the cylindrical sleeve; and an application force transmission mechanism is disposed between the cylindrical sleeve and the pushing plate (see Patent Literature 1, for example).

According to the hole-drilling device disclosed in Patent Literature 1, in the case of drilling a hole, during the drilling, when a contacting portion of the cylindrical sleeve comes into contact with the surface of the drilling object and thereby the cylindrical sleeve stops moving downward, movement in which the base still moving downward together with the drill bit body comes closer to the cylindrical sleeve is converted into movement in which the application force transmission mechanism pushes down the expanded diameter hole portion forming member via the pushing plate, such that a cutting bit provided at the lower end of the expanded diameter hole portion forming member (i.e., an undercut bit) is caused to protrude laterally from the drill bit body from an inclined surface formed at the lower end of the guide groove of the drill bit body, and thereby an expanded diameter hole portion is formed in the inner part of the drilled hole by cutting.

CITATION LIST

Patent Literature

PTL 1: Japanese Laid-Open Patent Application Publication No. H09-239722

SUMMARY OF INVENTION

Technical Problem

In the above-described hole-drilling device disclosed in Patent Literature 1, the application force transmission mechanism includes: a cam pivotally attached to the base; a first hammering transmission rod whose upper end is locked to one locking step of the cam and whose lower end is in contact with the contacting portion of the cylindrical sleeve in a manner penetrating the pushing plate; and a second hammering transmission rod whose upper end is locked to the other locking step of the cam and whose lower end is in contact with the pushing plate. In order to realize the application force transmission mechanism, the first and second hammering transmission rods and the pushing plate contacted by the lower end of the second hammering transmission rod are necessary in addition to the cam. Thus, there is room for improvement in terms of simplifying the structure of the hole-drilling device.

Moreover, the drill bit body may become worn significantly depending on its manner of use. However, since the drill bit body is fixed to the base, the drill bit body alone cannot be replaced.

The present invention has been made in order to solve the above-described problems. An object of the present invention is to provide a hole-drilling device for drilling a hole with an expanded diameter hole portion, the hole-drilling device realizing a simplified structure and including a replaceable drill bit body.

Solution to Problem

In order to achieve the above-described object, a hole-drilling device for drilling a hole with an expanded diameter hole portion according to one aspect of the present invention includes: a body including a shank at its rear part; a sleeve attached to a front part of the body such that the sleeve is movable relative to the body in a front-rear direction over a predetermined range, the sleeve including a contacting portion at its front end, the contacting portion coming into contact with a surface of a drilling object; a first urging unit that urges the sleeve forward relative to the body; a drill bit body provided with a drilling bit at its distal end, the drill bit body being configured such that a proximal end portion of the drill bit body is inserted in a bottomed insertion hole formed in the front part of the body, the drill bit body being inserted in and attached to the sleeve such that the drill bit body is movable in the front-rear direction; an expanded diameter hole portion forming member provided with a cutting bit at its distal end and attached to a side surface of the drill bit body such that the expanded diameter hole portion forming member is movable in the front-rear direction, the cutting bit protruding laterally from the drill bit body when the expanded diameter hole portion forming member moves forward on the side surface of the drill bit body; a second urging unit that urges the expanded diameter hole portion forming member rearward relative to the drill bit body; and a cam rotatably supported by the body and provided with contacting portions at both sides with respect to a rotation center, one of the contacting portions being contacted by a predetermined portion of an inner wall of the sleeve, the other contacting portion being contacted by a proximal end portion of the expanded diameter hole portion forming member. The expanded diameter hole portion forming member is configured to move forward on the side surface of the drill bit body owing to rotation of the cam when the body moves forward relative to the sleeve.

According to this configuration, at the time of performing the drilling work, after the contacting portion at the front end of the sleeve has come into contact with the surface of the drilling object, the body moves forward relative to the sleeve (the body moves to come closer to the contacting portion at the front end of the sleeve). As a result, the cam rotates to cause the expanded diameter hole portion forming member to move forward on the side surface of the drill bit body, such that the cutting bit protrudes laterally from the drill bit body. The cutting bit forms the expanded diameter hole portion by cutting. Here, it is configured such that the one contacting portion of the cam contacts the predetermined portion of the inner wall of the sleeve, and the other contacting portion contacts the proximal end portion of the expanded diameter hole portion forming member. This configuration makes it possible to reduce the number of components to simplify the structure and reduce the manufacturing cost. Since the drill bit body is not fixed to the body, the replacement of the drill bit body is possible.

The drill bit body may be provided with an elongated hole, the elongated hole being long in the front-rear direction and extending through the drill bit body. The sleeve may include: a drill bit body insertion hole, in which the drill bit body to which the expanded diameter hole portion forming member is attached is inserted; and a locking member attaching hole formed perpendicularly to the drill bit body insertion hole. The hole-drilling device may further include a locking member movably disposed in the locking member attaching hole and inserted in the elongated hole of the drill bit body.

According to this configuration, the drill bit body can be detached by removing the locking member from the elongated hole of the drill bit body, and the drill bit body can be attached by inserting the locking member in the elongated hole of the drill bit body. Thus, the attachment and detachment of the drill bit body can be readily performed. This makes it possible to readily perform the replacement of the drill bit body.

The drill bit body may be provided with a groove for dividing the proximal end portion of the drill bit body into two portions and allowing the cam to be interposed between the two divided portions, and the predetermined portion contacted by the one contacting portion of the cam may be configured to be positioned on the inner wall of the sleeve, the inner wall being positioned at an opposite side to the expanded diameter hole portion forming member as seen from the drill bit body.

According to this configuration, the groove formed in the drill bit body serves as a part of a cam placement region for the cam. This makes it possible to reduce the size of the device.

The hole-drilling device for drilling a hole with an expanded diameter hole portion further includes a dust collection adapter attached to an outer surface of a front part of the sleeve such that the dust collection adapter is rotatable relative to the sleeve, the dust collection adapter being connected to an external dust collector. The sleeve is provided with a through-hole that communicates between inside and outside of the front part of the sleeve. The drill bit body includes therein a dust suction passage extending in the front-rear direction. A front part of the drill bit body is provided with a suction port, which communicates between a front end portion of the dust suction passage and outside. A rear end portion of the dust suction passage is provided with an outlet port, which communicates between the rear end portion of the dust suction passage and an outer surface of the drill bit body. The dust suction passage and inside of the dust collection adapter are configured to be in communication with each other via the outlet port and the through-hole.

According to this configuration, by connecting the dust collection adapter to an external dust collector, dust generated during the drilling work is sucked through the suction port to pass through the dust suction passage, the outlet port, and the through-hole, and then collected by the external dust collector via the dust collection adapter. In this manner, the dust generated during the drilling work can be sucked and collected. This makes smooth drilling work possible. Since the scattering of the dust to the outside during the drilling work can be reduced, the work environment can be improved. Moreover, when the hole drilling is completed, the amount of dust remaining in the drilled hole and the expanded diameter hole portion is small. Therefore, the cleaning inside the drilled hole and the expanded diameter hole portion after the hole drilling is completed can be simplified or even eliminated.

Advantageous Effects of Invention

The present invention is configured as described above, and provides the following advantageous effects: the structure of the hole-drilling device for drilling a hole with an expanded diameter hole portion can be simplified; and replacement of the drill bit body is made possible.

The above object, other objects, features, and advantages of the present invention will be made clear by the following detailed description of preferred embodiments with reference to the accompanying drawings.

DESCRIPTION OF EMBODIMENTS

Hereinafter, preferred embodiments of the present invention are described with reference to the drawings. In the drawings, the same or corresponding elements are denoted by the same reference signs, and repeating the same descriptions is avoided below. The present invention is not limited to the embodiments described below.

Embodiment 1

Figure 1:
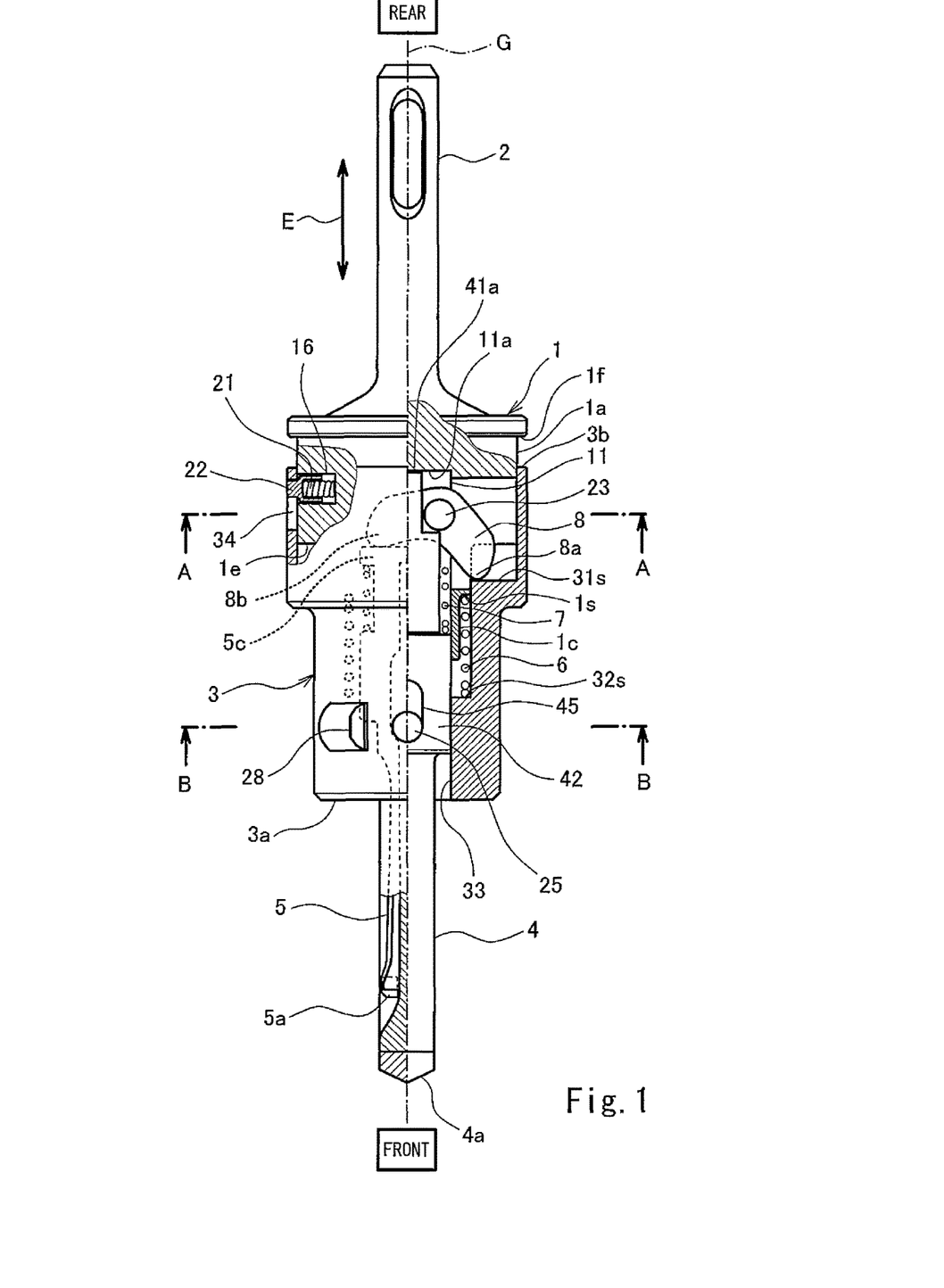
FIG. 1 is a side view showing a sectional view of a part of a hole-drilling device for drilling a hole with an expanded diameter hole portion as one configuration example of Embodiment 1 of the present invention.
Figure 2A:
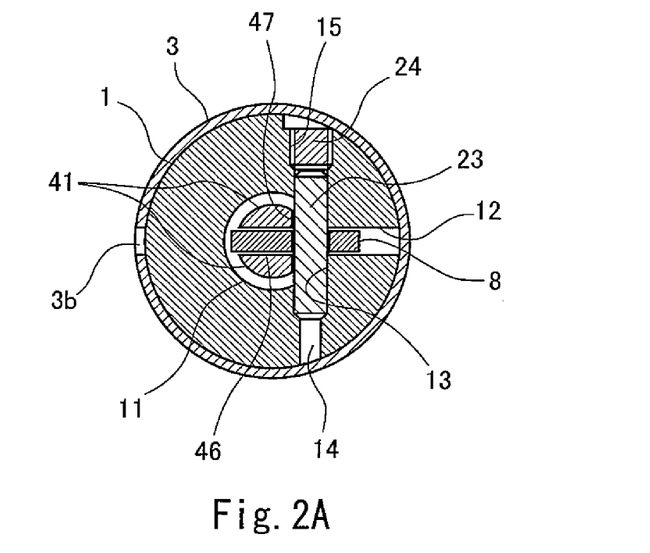
FIG. 2A is a sectional view taken along a line A-A of FIG. 1.
Figure 2B:
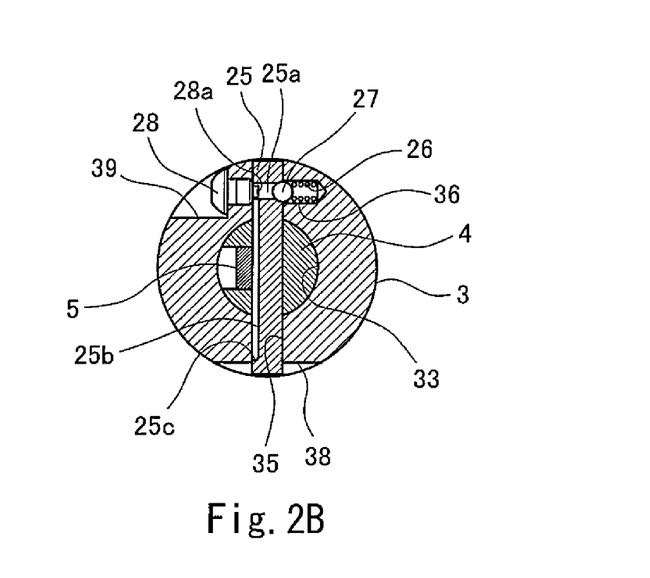
FIG. 2B is a sectional view taken along a line B-B of FIG. 1.
Figure 3A:
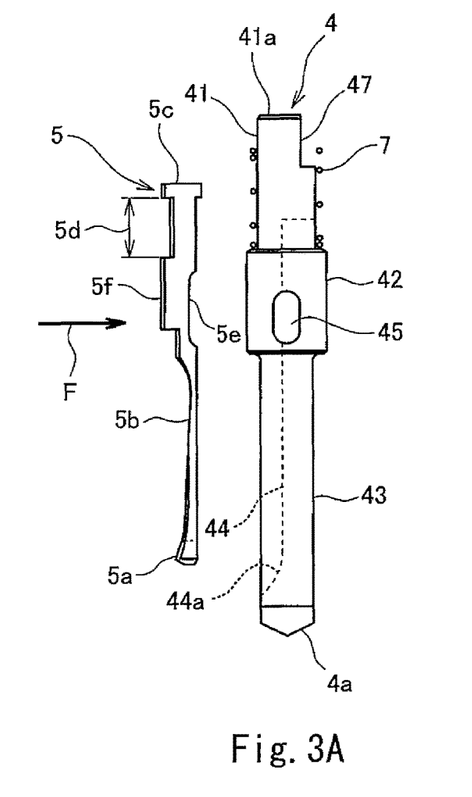
FIG. 3A shows an expanded diameter hole portion forming member, a drill bit body, and so forth of the hole-drilling device of FIG. 1.
Figure 3B:
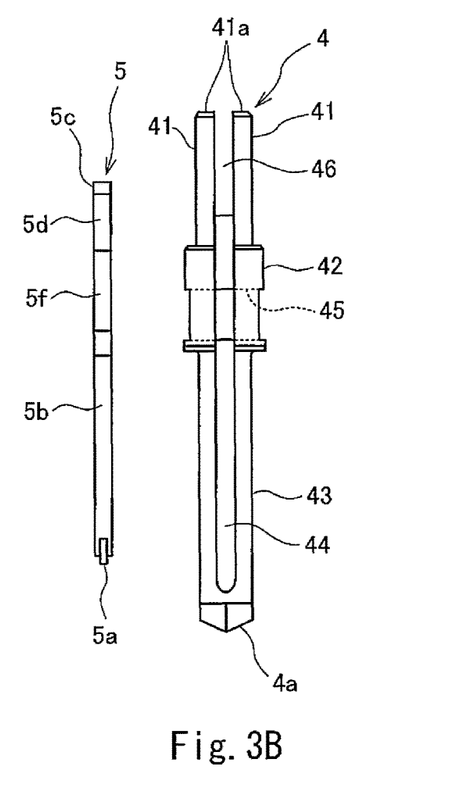
FIG. 3B shows the expanded diameter hole portion forming member and the drill bit body that are viewed in the direction of an arrow F of FIG. 3A.
Figure 4A:
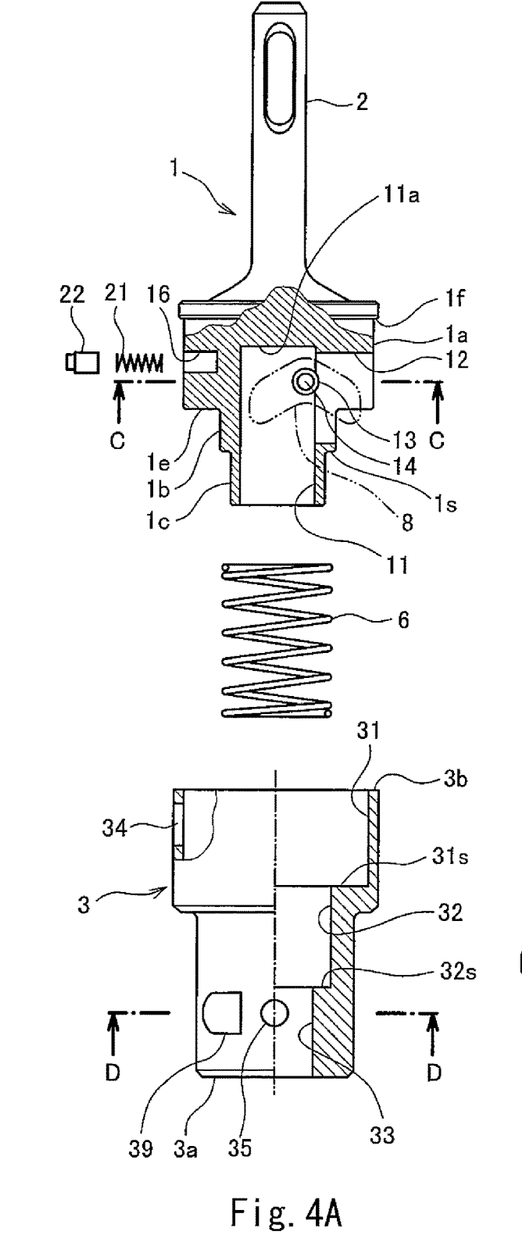
FIGS. 4A to 4C show components of the hole-drilling device of FIG. 1, excluding the components shown in FIG. 3A.
Figure 4B:
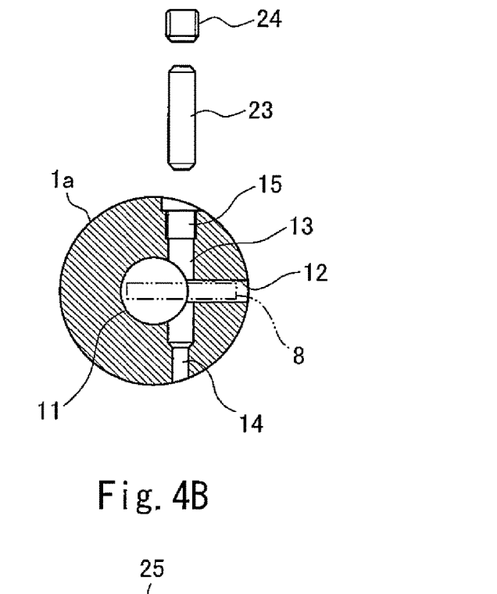
Figure 4C:
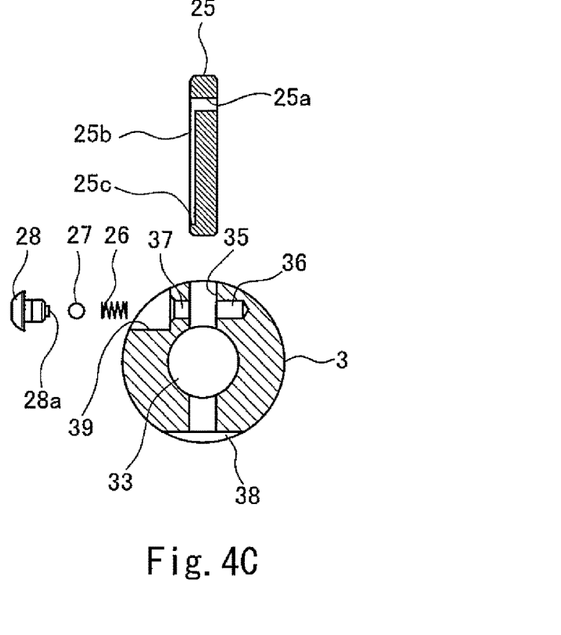

FIG. 1 is a side view showing a sectional view of a part of a hole-drilling device for drilling a hole with an expanded diameter hole portion as one configuration example of Embodiment 1 of the present invention. FIG. 2A is a sectional view taken along a line A-A of FIG. 1. FIG. 2B is a sectional view taken along a line B-B of FIG. 1. FIG. 3A shows an expanded diameter hole portion forming member, a drill bit body, and so forth of the hole-drilling device. FIG. 3B shows the expanded diameter hole portion forming member and the drill bit body that are viewed in the direction of an arrow F of FIG. 3A. FIGS. 4A to 4C show components of the hole-drilling device, excluding the components shown in FIG. 3A. FIG. 4B shows a sectional view taken along a line C-C of FIG. 4A, and also shows components relating to the part in the sectional view. FIG. 4C is a sectional view taken along a line D-D of FIG. 4A, and also shows components relating to the part in the sectional view. It should be noted that, for the sake of convenience, in the description given below, the "front" and "rear" of the hole-drilling device are set as shown in, for example, FIG. 1.

The hole-drilling device includes: a body 1 including a shank 2 at its rear part; a cylindrical sleeve 3; a drill bit body 4 including a drilling bit 4a for drilling a straight hole, the drilling bit 4a being fixed to the distal end of the drill bit body 4; an expanded diameter hole portion forming member 5 attached to the side surface of the drill bit body 4 such that the expanded diameter hole portion forming member 5 is movable in an axial direction (i.e., front-rear direction), the expanded diameter hole portion forming member 5 including a cutting bit 5a for forming an expanded diameter hole portion by cutting, the cutting bit 5a being fixed to the distal end of the expanded diameter hole portion forming member 5; coil-shaped compression springs 6 and 7; and a boomerang-shaped cam 8 rotatably mounted to the front part of the body 1. The compression spring 6 serves as a first urging unit and urges the sleeve 3 forward relative to the body 1. The compression spring 7 serves as a second urging unit and urges the expanded diameter hole portion forming member 5 rearward relative to the drill bit body 4.

The central axis G of the hole-drilling device also serves as the central axis of each of the body 1 including the shank 2, the sleeve 3, and the drill bit body 4. The central axis G is equivalent to a rotational axis about which the hole-drilling device rotates. It should be noted that the axial direction herein is the axial direction of the central axis G of the hole-drilling device. In other words, the axial direction herein is the axial direction of the rotational axis. An arrow E in FIG. 1 indicates the axial direction, which is equivalent to the front-rear direction in this example.

The rear part of the body 1 includes the shank 2, which is connected to a rotation drive shaft (not shown) of a hole-drilling tool. The front part of the body 1 includes an insertion hole 11 with a round cross section, in which the drill bit body 4 is inserted. A rear end 41a of the drill bit body 4 is in contact with a contact surface 11a, which is the innermost surface of the insertion hole 11.

The drilling bit 4a is provided at the distal end (front end) of the drill bit body 4. A bit used for drilling an ordinary straight hole can be used as the drilling bit 4a. The central part of the drill bit body 4 is provided with a slider 42 having a large diameter. The slider 42 is kept in a state where its rear end is inserted in the insertion hole 11 of the body 1. When the body 1 and the drill bit body 4 move forward relative to the sleeve 3, the slider 42 slidingly moves along the inner surface of a smaller-diameter hole 33 of the sleeve 3.

As shown in FIGS. 3A and 3B, a rear part 41 of the drill bit body 4 is provided with a groove 46 for avoiding the cam 8, and also provided with a recess 47 for avoiding a support shaft 23 of the cam 8. The slider 42 of the drill bit body 4 is provided with an elongated hole 45, in which a locking member 25 is inserted. The elongated hole 45 is long in the front-rear direction and extends through the drill bit body 4 in a direction perpendicular to the central axis (G) of the drill bit body 4. A guide groove 44 extending in the axial direction is formed in the side surface of the drill bit body 4 from its rear part 41 to its front part 43. An inclined surface 44a inclined outward is formed at the front end portion of the guide groove 44.

The expanded diameter hole portion forming member 5 is formed such that its front half portion 5b has proper elasticity. The cutting bit 5a is provided at the front end of the expanded diameter hole portion forming member 5. The expanded diameter hole portion forming member 5 is attached to the side surface of the drill bit body 4, such that the expanded diameter hole portion forming member 5 is movable in the axial direction over a predetermined range. Specifically, the expanded diameter hole portion forming member 5 is disposed in the guide groove 44 formed in the side surface of the drill bit body 4, such that the expanded diameter hole portion forming member 5 is movable in the axial direction, and such that the cutting bit 5a faces the inclined surface 44a of the guide groove 44. A supporting portion 5c is provided at the rear end of the expanded diameter hole portion forming member 5. In front of the supporting portion 5c, a spring attaching portion 5d is provided at the outer side of the expanded diameter hole portion forming member 5. A recess 5e for avoiding the locking member 25 is provided at the inner side of the central portion of the expanded diameter hole portion forming member 5.

The expanded diameter hole portion forming member 5 is set in the guide groove 44 of the drill bit body 4. The compression spring 7 is set on the rear part 41 of the drill bit body 4 on which the expanded diameter hole portion forming member 5 has been set. At the time, the compression spring 7 is set in a compressed manner such that the length of the compression spring 7 coincides with the length of the spring attaching portion 5d. It should be noted that FIG. 3A shows a sectional view of the compression spring 7 when the compression spring 7 is in a non-compressed state.

When the expanded diameter hole portion forming member 5 is set in the guide groove 44 of the drill bit body 4, an outer surface 5f of the central portion of the expanded diameter hole portion forming member 5 serves as a part of a cylindrical surface together with the surface of the slider 42 of the drill bit body 4. Also, the surface of the spring attaching portion 5d of the expanded diameter hole portion forming member 5 serves as a part of a cylindrical surface together with the surface of the rear part 41 of the drill bit body 4.

As shown in FIGS. 4A to 4C, the body 1 includes: a larger-diameter portion 1a, a medium-diameter portion 1b, and a smaller-diameter portion 1c, which are provided on the front part of the body 1 at the opposite side to the shank 2; the insertion hole 11, in which the drill bit body 4, the expanded diameter hole portion forming member 5, and the compression spring 7 are inserted; and a groove 12, to which the cam 8 is attached. In addition, a hole 13, a hole 14, and a screw hole 15 are provided in order to allow the cam 8 to be pivotally attached to the body 1. The cam 8 is provided with a shaft hole in which the support shaft 23 is inserted. After the support shaft 23 is inserted in the hole 13 through the shaft hole, a locking screw 24 is screwed into the screw hole 15 to fix the support shaft 23 to the body 1. In this manner, the cam 8 is rotatably mounted to the support shaft 23, which is fixed to the body 1.

The larger-diameter portion 1a of the body 1 is provided with a retention hole 16 for retaining a spring 21 and a locking pin 22. At the rear end of the larger-diameter portion 1a of the body 1, a protruding portion including a sleeve contact surface 1f is provided. At the end of hole drilling, the sleeve contact surface 1f comes into contact with a rear end surface 3b of the sleeve 3. It should be noted that the reference sign 1e indicates a front end surface of the larger-diameter portion 1a.

The sleeve 3 is attached to the body 1 such that the sleeve 3 is movable in the front-rear direction over a predetermined range. The sleeve 3 includes a contacting portion 3a at its front end. The contacting portion 3a comes into contact with the surface of a drilling object.

The sleeve 3 is provided with a larger-diameter hole 31, a medium-diameter hole 32, and a smaller-diameter hole (a drill bit body insertion hole) 33, which are continuously formed and each of which has the central axis G (FIG. 1) at its center and a round cross section. The side wall of the larger-diameter hole 31 of the sleeve 3 is provided with a long and narrow elongated hole 34 extending in the axial direction. The larger-diameter portion 1a of the body 1 is fitted in the larger-diameter hole 31 of the sleeve 3, and the locking pin 22 protruding from the body 1 is locked to the elongated hole 34 formed in the sleeve 3.

It should be noted that, as shown in FIG. 1, the locking pin 22 is retained in the retention hole 16 formed in the body 1, and the urging force of the spring 21 causes the head of the locking pin 22 to protrude into the elongated hole 34. In a state where the locking pin 22 is pushed to the retention hole 16 side against the spring 21, the body 1 and the sleeve 3 can be moved away and separated from each other in the front-rear direction.

When the sleeve 3 is attached to the body 1, the compression spring 6 is accommodated between the outer surface of the smaller-diameter portion 1c of the body 1 and the side wall surface of the medium-diameter hole 32 of the sleeve 3. At the time, both ends of the compression spring 6 are held between a stepped portion 1s of the body 1 and a stepped portion 32s of the sleeve 3, and the compression spring 6 urges the sleeve 3 forward relative to the body 1. That is, the body 1 and the sleeve 3 are urged by the compression spring 6 in the axial direction such that the body 1 and the sleeve 3 are urged in respective directions away from each other, and the locking pin 22 is positioned at the rear end of the elongated hole 34.

Figure 5A:
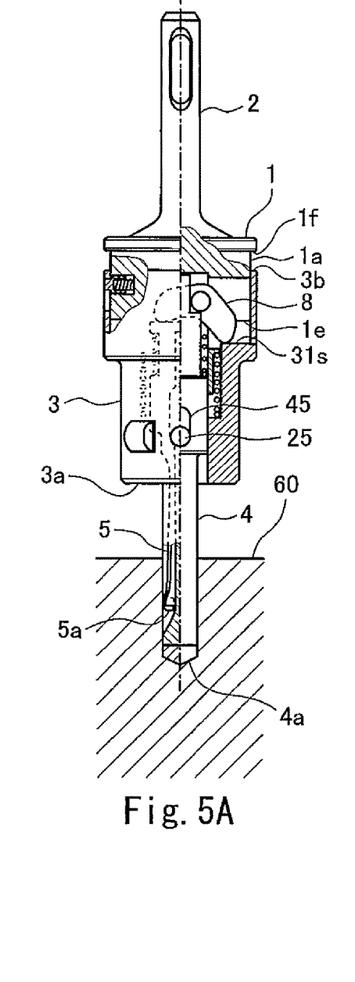
FIGS. 5A to 5D show one example of the manner of using the hole-drilling device of FIG. 1.
Figure 5B:
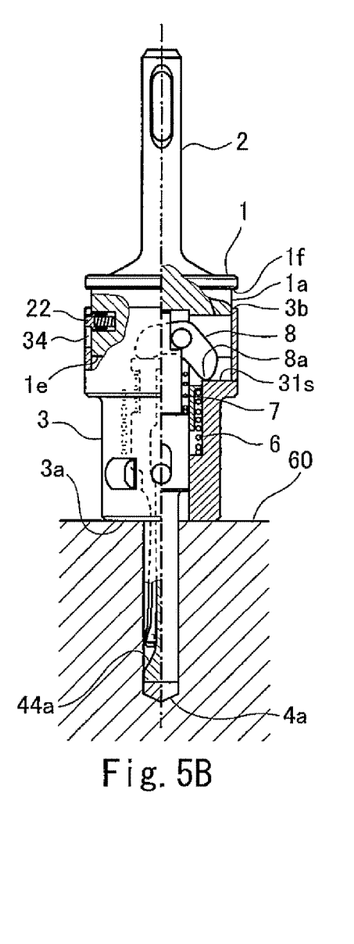
Figure 5C:
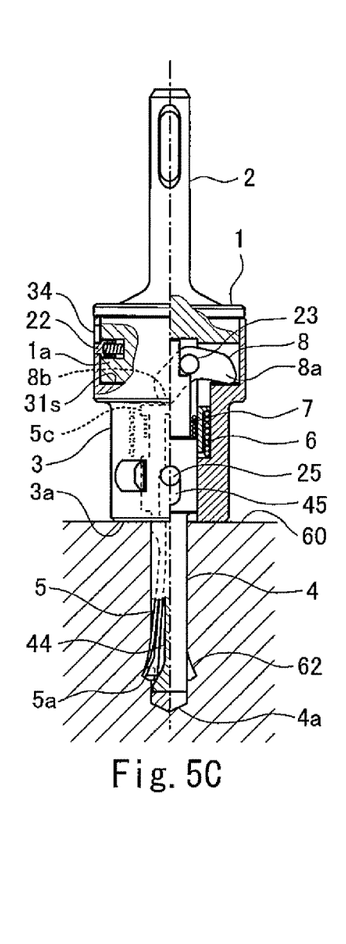

Here, the range of movement of the sleeve 3 relative to the body 1 is restricted to a range from a state where the locking pin 22 is positioned at the rear end of the elongated hole 34 (i.e., a state shown in each of FIG. 1 and FIG. 5A) to a state where the sleeve contact surface 1f of the body 1 is in contact with the rear end surface 3b of the sleeve 3 (i.e., a state shown in FIG. 5C).

As shown in FIG. 4C, the side wall of the smaller-diameter hole 33 of the sleeve 3 is provided with: a through-hole (a locking member attaching hole) 35, which is formed perpendicularly to the smaller-diameter hole 33 and in which the locking member 25 is inserted; a hole 36, which accommodates a spring 26 and a locking ball 27; a screw hole 37, into which a retaining screw 28 including a protrusion 28a at its distal end is screwed; a recess 38 for exposing an end portion and its vicinity of the locking member 25 penetrating the through-hole 35; and a recess 39 for allowing the retaining screw 28 to be attached. The locking member 25 is formed in the following manner: for example, a locking hole 25a and a guide groove 25b are formed in a round bar member.

In a case where the locking member 25 is attached to the sleeve 3, as shown in FIG. 2B, when the locking member 25 is inserted in the through-hole 35 and is in a locked position, a part of the locking ball 27 urged by the spring 26 protrudes into the locking hole 25a of the locking member 25, and retains the locking member 25 in the locked position. By pushing the end portion of the locking member 25, the end portion being exposed in the recess 38, and pulling the other end portion of the locking member 25, the locking ball 27 is entirely accommodated in the hole 36, and in this state, the locking member 25 can be removed from the smaller-diameter hole 33. When pulling out the locking member 25, the protrusion 28a of the retaining screw 28 comes into contact with an end portion 25c of the guide groove 25b and stops (the position of the locking member 25 at the time is referred to as a "removal position"), and thereby falling of the locking member 25 can be prevented.

When assembling the hole-drilling device, for example, the body 1 to which the cam 8 is pivotally attached and the sleeve 3 to which the locking member 25 is attached are prepared; the compression spring 6 is interposed between the body 1 and the sleeve 3; the sleeve 3 is attached to the body 1 such that the head of the locking pin 22 protrudes into the elongated hole 34; thereafter, the locking member 25 is set in the removal position; and the drill bit body 4 on which the expanded diameter hole portion forming member 5 and the compression spring 7 are set is inserted in the smaller-diameter hole 33 of the sleeve 3 to bring the rear end 41a of the drill bit body 4 into contact with the contact surface 11a, which is the innermost bottom surface of the insertion hole 11.

At the time, the support shaft 23 of the cam 8 is placed in the recess 47 of the rear part 41 of the drill bit body 4, and also, the cam 8 is placed in the groove 46 between two divided portions of the rear part 41 (see FIG. 2A). Finally, by pushing the locking member 25 from the removal position to the locked position, the assembling of the hole-drilling device can be completed. As a result, the cam 8 is in a state where one contacting portion 8a is in contact with a stepped portion 31s of the sleeve 3 and the other contacting portion 8b is in contact with a supporting portion 5c of the expanded diameter hole portion forming member 5.

In the case of performing replacement of the drill bit body 4, by pushing the locking member 25 out of the locked position into the removal position, the drill bit body 4 on which the expanded diameter hole portion forming member 5 and the compression spring 7 are set can be pulled forward out of the body 1 and the sleeve 3. Thus, the replacement of the drill bit body 4 can be readily performed. The replacement of the expanded diameter hole portion forming member 5 and the compression spring 7 can be performed in a similar manner.

Next, one example of the manner of using the hole-drilling device is described. FIGS. 5A to 5D show the one example of the manner of using the hole-drilling device.

The shank 2 of the hole-drilling device is mounted to, for example, a chuck of an electric tool such as a hammer drill. The drilling bit 4a of the drill bit body 4 is pushed against a surface 60 of a drilling object, which is a concrete floor, for example. The electric tool is driven to drill a hole (FIG. 5A). When the drilled hole is formed to reach a predetermined depth and the contacting portion 3a of the sleeve 3 comes into contact with the surface 60 of the drilling object, the sleeve 3 stops moving downward (FIG. 5B).

When the sleeve 3 stops moving downward, the body 1, which is still moving downward, is pushed into the sleeve 3 against the compression spring 6, and thereby the stepped portion 31s of the sleeve 3 pushes up the one contacting portion 8a of the cam 8 to cause rotation of the cam 8. As a result, the expanded diameter hole portion forming member 5, which is contacted by the other contacting portion 8b of the cam 8, is pushed down against the compression spring 7. Consequently, the cutting bit 5a moves on the inclined surface 44a, which is the front end portion of the guide groove 44 of the drill bit body 4, to protrude laterally from the drill bit body 4 and cut the side wall of the drilled hole.

Figure 5D:
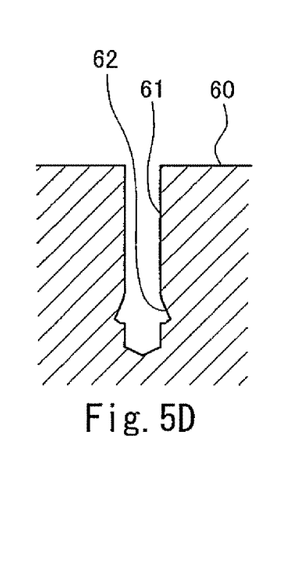

Thereafter, when the sleeve contact surface 1f of the body 1 comes into contact with the rear end surface 3b of the sleeve 3, the expanded diameter hole portion forming member 5 stops moving downward. At the time, the cutting bit 5a reaches its maximum protruding point on the side surface of the drill bit body 4, and ends the forming of a tapered expanded diameter hole portion 62 whose diameter expands downward relative to the side wall of the drilled hole 61 (FIG. 5C). The expanded diameter hole portion 62 is formed in the side wall of the inner part of the drilled hole 61 in an annular manner over the entire circumference (FIG. 5D). Here, the formation of the drilled hole 61 and the expanded diameter hole portion 62 ends when the sleeve contact surface 1f of the body 1 comes into contact with the rear end surface 3b of the sleeve 3. An operator can visually confirm that the formation of the drilled hole 61 and the expanded diameter hole portion 62 has ended by looking at the sleeve contact surface 1f of the body 1 and the rear end surface 3b of the sleeve 3.

After the formation of the expanded diameter hole portion 62 has ended, when the force that pushes the device into the drilled hole is released, the sleeve 3 returns to its original position owing to the urging force of the compression spring 6. At the same time, the expanded diameter hole portion forming member 5 is pulled upward by the compression spring 7 such that the cutting bit 5a retracts from the inclined surface 44a into the guide groove 44, and the drill bit body 4 is pulled out of the drilled hole 61 to end the drilling work.

It should be noted that, while no drilling work is being performed, the drill bit body 4 is retained by the insertion of the locking member 25 locked to the sleeve 3 into the elongated hole 45. Accordingly, the drill bit body 4 is movable in the axial direction (the front-rear direction) over a range corresponding to the length of the elongated hole 45. On the other hand, while the drilling work is being performed, the shank 2 is always in the state of being pushed forward, and thereby a state where the rear end 41a of the drill bit body 4 is in contact with the contact surface 11a of the insertion hole 11 of the body 1 is maintained.

In the present embodiment, at the time of performing the drilling work, after the contacting portion 3a at the front end of the sleeve 3 has come into contact with the surface of the drilling object, the body 1 moves forward relative to the sleeve 3 (the body 1 moves to come closer to the contacting portion 3a at the front end of the sleeve 3). As a result, the cam 8 rotates to cause the expanded diameter hole portion forming member 5 to move forward on the side surface of the drill bit body 4, such that the cutting bit 5a protrudes laterally from the drill bit body 4. The cutting bit 5a forms the expanded diameter hole portion by cutting. Here, it is configured such that the one contacting portion 8a of the cam 8 contacts a predetermined portion of the inner wall of the sleeve 3 (the stepped portion 31s), and the other contacting portion 8b contacts the proximal end portion of the expanded diameter hole portion forming member 5 (the supporting portion 5c). This configuration makes it possible to reduce the number of components to simplify the structure and reduce the manufacturing cost.

Since the drill bit body 4 is not fixed to the body 1, the replacement of the drill bit body 4 is possible. In the present embodiment, the drill bit body 4 can be detached by removing the locking member 25 from the elongated hole 45 of the drill bit body 4, and the drill bit body 4 can be attached by inserting the locking member 25 in the elongated hole 45 of the drill bit body 4. Thus, the attachment and detachment of the drill bit body 4 can be readily performed. This makes it possible to readily perform the replacement of the drill bit body 4.

The drill bit body 4 is provided with the groove 46 for dividing the proximal end portion of the drill bit body 4 (i.e., a part of the rear part 41) into two portions and allowing the cam 8 to be interposed between the two divided portions. Thus, the groove 46 formed in the drill bit body 4 serves as a part of a cam placement region for the cam 8. This makes it possible to reduce the size of the device.

Embodiment 2

Figures 6A, 6B:
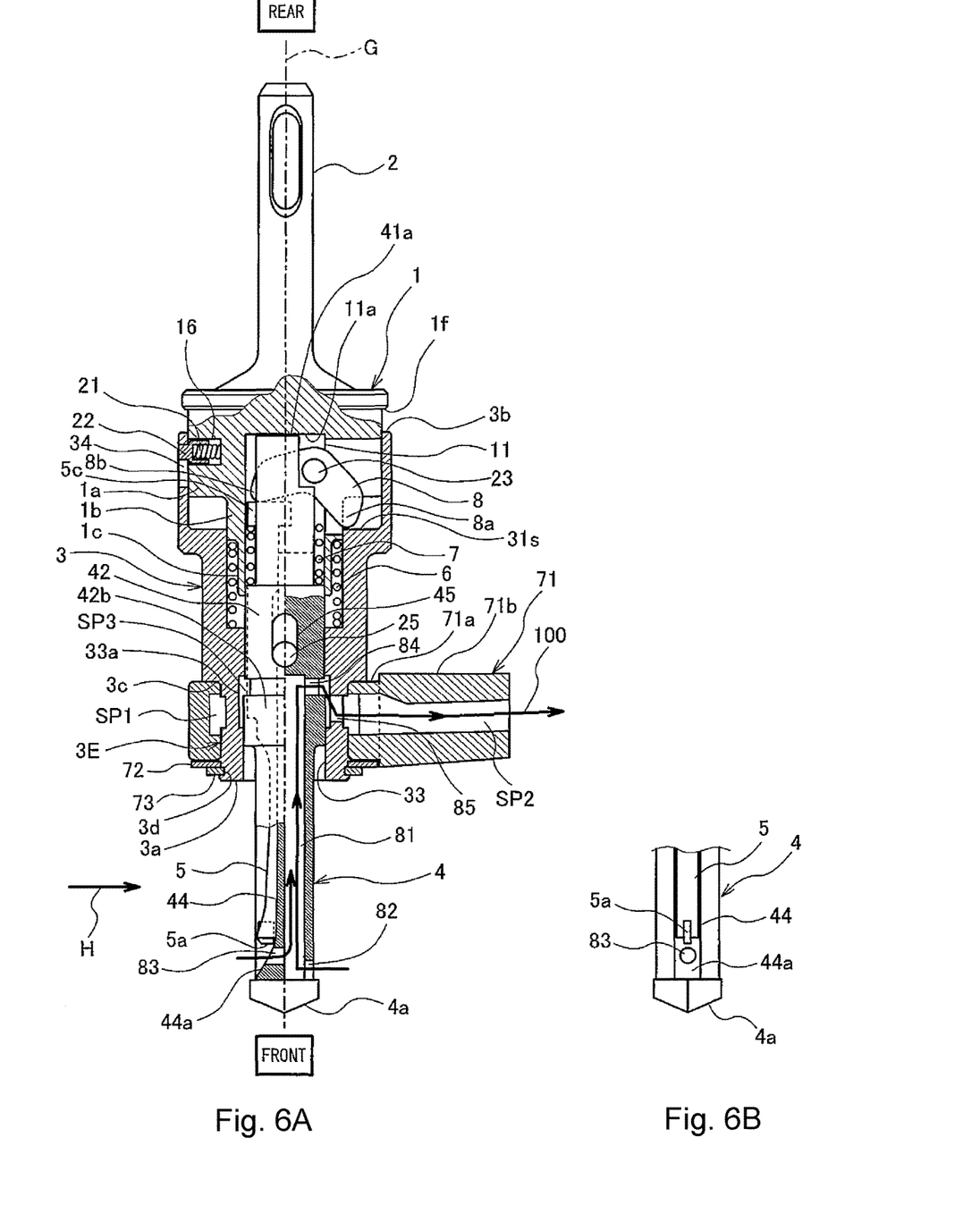
FIG. 6A is a side view showing a sectional view of a part of a hole-drilling device for drilling a hole with an expanded diameter hole portion as one configuration example of Embodiment 2 of the present invention.
FIG. 6B partially shows an expanded diameter hole portion forming member and a drill bit body that are viewed in the direction of an arrow H of FIG. 6A.

FIG. 6A is a side view showing a sectional view of a part of a hole-drilling device for drilling a hole with an expanded diameter hole portion as one configuration example of Embodiment 2 of the present invention. FIG. 6B partially shows an expanded diameter hole portion forming member and a drill bit body that are viewed in the direction of an arrow H of FIG. 6A. It should be noted that, in FIGS. 6A and 6B, components corresponding to those of the hole-drilling device of FIG. 1 (i.e., components that have the same functions as those of the components of the hole-drilling device of FIG. 1) are denoted by the same reference signs as those of the hole-drilling device of FIG. 1, and the description of such components is omitted.

The hole-drilling device shown in FIG. 6A is such that the configuration for forming the drilled hole 61 and the expanded diameter hole portion 62 through drilling work (see FIG. 5D) is the same as that of the hole-drilling device of FIG. 1 described in Embodiment 1. Roughly speaking, the hole-drilling device shown in FIG. 6A is configured such that a dust collection adapter 71 is attached to the hole-drilling device of FIG. 1, and dust generated during the drilling work is collected into an external dust collector (not shown) via the dust collection adapter 71. This configuration is described below in detail.

A stepped portion 3c is formed at the front part of the sleeve 3, and thereby an adapter attaching part 3E with a reduced external diameter is formed. The dust collection adapter 71 is attached to the adapter attaching part 3E. An annular groove 3d, in which a retaining ring 73 is fitted, is formed in the adapter attaching part 3E.

The dust collection adapter 71 is formed by connecting a cylindrical connection pipe 71b to an annular portion 71a, in which the adapter attaching part 3E of the sleeve 3 is inserted. At the time of using the hole-drilling device, a hose of the dust collector is connected to the connection pipe 71b.

By inserting the adapter attaching part 3E of the sleeve 3 in the annular portion 71a and fitting the retaining ring 73 in the annular groove 3d via a washer 72, the dust collection adapter 71 is attached to the adapter attaching part 3E. In this manner, the dust collection adapter 71 is disposed between the stepped portion 3c and the retaining ring 73, and mounted to the sleeve 3 such that the dust collection adapter 71 is rotatable relative to the sleeve 3.

An annular space SP1 is formed between the surface of the adapter attaching part 3E of the sleeve 3 and the annular portion 71a of the dust collection adapter 71. The annular space SP1 is continuous with an inner space SP2 of the connection pipe 71b.

The sleeve 3 is provided with a through-hole 85, which communicates between the inner surface and the outer surface of the adapter attaching part 3E.

The drill bit body 4 includes therein a dust suction passage (long and narrow space) 81, which is a long and narrow hole extending in the direction of the central axis (G) of the drill bit body 4 (i.e., extending in the front-rear direction). The front part of the drill bit body 4 is provided with suction ports 82 and 83, which communicate between the front end portion of the dust suction passage 81 and the outside. The rear end portion of the dust suction passage 81 is provided with an outlet port 84, which communicates between the rear end portion of the dust suction passage 81 and the outer surface of the drill bit body 4. The suction ports 82 and 83 and the outlet port 84 are each formed as a round hole, for example.

The drill bit body 4 is also provided with a slider 42b, which is positioned forward from the slider 42 such that the outlet port 84 is disposed between the sliders 42 and 42b and which has the same diameter as that of the slider 42. Similar to the slider 42, the slider 42b slidingly moves along the inner surface of the smaller-diameter hole 33 of the sleeve 3 when the body 1 and the drill bit body 4 move forward relative to the sleeve 3.

The smaller-diameter hole 33 of the sleeve 3, which is a region including the range of movement of the outlet port 84 of the drill bit body 4 when the body 1 and the drill bit body 4 move forward relative to the sleeve 3, is provided with an annular recess 33a. An annular space SP3 is formed between the annular recess 33a and the drill bit body 4.

The rear end portion of the dust suction passage 81 inside the drill bit body 4 and the inner space of the dust collection adapter 71 (the annular space SP1 and the inner space SP2 of the connection pipe 71b) are configured to be always in communication with each other via the outlet port 84, the annular space SP3, and the through-hole 85.

At the time of performing drilling work using the hole-drilling device of the present embodiment, the hose of the dust collector is connected to the connection pipe 71b, and the drilling work is performed while operating the dust collector. In the same manner as described in Embodiment 1, the drilled hole 61 (see FIG. 5D) is formed by the drilling bit 4a provided at the distal end of the drill bit body 4, and the expanded diameter hole portion 62 (see FIG. 5D) is formed by the cutting bit 5a of the expanded diameter hole portion forming member 5. During the drilling work, the body 1, the sleeve 3, the drill bit body 4, and so forth rotate, but the dust collection adapter 71 do not rotate.

In the present embodiment, the same advantageous effects as those provided by Embodiment 1 are obtained. In addition, in the present embodiment, dust generated during the formation of the drilled hole 61 and the expanded diameter hole portion 62 is, along a passage indicated by an arrow 100, sucked through the suction ports 82 and 83 to pass through the dust suction passage 81, the outlet port 84, the annular space SP3, and the through-hole 85, and then collected by the dust collector via the dust collection adapter 71 and the hose connected thereto. In this manner, the dust generated during the drilling work can be sucked and collected. This makes smooth drilling work possible. Since the scattering of the dust to the outside during the drilling work can be reduced, the work environment can be improved. Moreover, when the hole drilling is completed, the amount of dust remaining in the drilled hole 61 and the expanded diameter hole portion 62 is small. Therefore, the cleaning inside the drilled hole 61 and the expanded diameter hole portion 62 after the hole drilling is completed can be simplified or even eliminated.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details can be substantially altered without departing from the spirit of the present invention.

INDUSTRIAL APPLICABILITY

The present invention is useful, for example, as a hole-drilling device for drilling a hole with an expanded diameter hole portion, which realizes a simplified structure and makes the replacement of the drill bit body possible.

REFERENCE SIGNS LIST 1 body
2 shank
3 sleeve
3a contacting portion
4 drill bit body
4a drilling bit
5 expanded diameter hole portion forming member
5a cutting bit
6, 7 compression spring
8 cam
8a, 8b contacting portion
11 insertion hole
23 support shaft of the cam
25 locking member
33 smaller-diameter hole
35 through-hole 45 elongated hole
46 groove
71 dust collection adapter
81 dust suction passage
82, 83 suction port
84 outlet port
85 through-hole

The invention claimed is:

1. A hole-drilling device for drilling a hole with an expanded diameter hole portion, the hole-drilling device comprising:
   a body including a shank at its rear part;
   a sleeve attached to a front part of the body such that the sleeve is movable relative to the body in a front-rear direction over a predetermined range, the sleeve including a contacting portion at its front end, the contacting portion coming into contact with a surface of a drilling object;
   a first urging unit that urges the sleeve forward relative to the body;
   a drill bit body provided with a drilling bit at its distal end, the drill bit body being configured such that a proximal end portion of the drill bit body is inserted in a bottomed insertion hole formed in the front part of the body, the drill bit body being inserted in and attached to the sleeve such that the drill bit body is movable in the front-rear direction;
   an expanded diameter hole portion forming member provided with a cutting bit at its distal end and attached to a side surface of the drill bit body such that the expanded diameter hole portion forming member is movable in the front-rear direction, the cutting bit protruding laterally from the drill bit body when the expanded diameter hole portion forming member moves forward on the side surface of the drill bit body;
   a second urging unit that urges the expanded diameter hole portion forming member rearward relative to the drill bit body; and
   a cam rotatably supported by the body and provided with contacting portions at both sides with respect to a rotation center, one of the contacting portions being contacted by a predetermined portion of an inner wall of the sleeve, the other contacting portion being contacted by a proximal end portion of the expanded diameter hole portion forming member, wherein
   the expanded diameter hole portion forming member is configured to move forward on the side surface of the drill bit body owing to rotation of the cam when the body moves forward relative to the sleeve.

2. The hole-drilling device for drilling a hole with an expanded diameter hole portion according to claim 1, wherein
   the drill bit body is provided with an elongated hole, the elongated hole being long in the front-rear direction and extending through the drill bit body,
   the sleeve includes:
   a drill bit body insertion hole, in which the drill bit body to which the expanded diameter hole portion forming member is attached is inserted; and
   a locking member attaching hole formed perpendicularly to the drill bit body insertion hole, and
   the hole-drilling device further comprises a locking member movably disposed in the locking member attaching hole and inserted in the elongated hole of the drill bit body.

3. The hole-drilling device for drilling a hole with an expanded diameter hole portion according to claim 1, wherein
   the drill bit body is provided with a groove for dividing the proximal end portion of the drill bit body into two portions and allowing the cam to be interposed between the two divided portions, and
   the predetermined portion contacted by the one contacting portion of the cam is configured to be positioned on the inner wall of the sleeve, the inner wall being positioned at an opposite side to the expanded diameter hole portion forming member as seen from the drill bit body.

4. The hole-drilling device for drilling a hole with an expanded diameter hole portion according to claim 1, further comprising a dust collection adapter attached to an outer surface of a front part of the sleeve such that the dust collection adapter is rotatable relative to the sleeve, the dust collection adapter being connected to an external dust collector, wherein
   the sleeve is provided with a through-hole that communicates between inside and outside of the front part of the sleeve,
   the drill bit body includes therein a dust suction passage extending in the front-rear direction,
   a front part of the drill bit body is provided with a suction port, which communicates between a front end portion of the dust suction passage and outside,
   a rear end portion of the dust suction passage is provided with an outlet port, which communicates between the rear end portion of the dust suction passage and an outer surface of the drill bit body, and
   the dust suction passage and inside of the dust collection adapter are configured to be in communication with each other via the outlet port and the through-hole.

* * * * *